United States Patent Office 3,542,833
Patented Nov. 24, 1970

3,542,833
HIGHER ALKYL CONTAINING METHYLPHENYLSILANES
Richard W. Alsgaard, Midland, Mich., assignor to Dow Corning Corporation, Midland, Mich., a corporation of Michigan
No Drawing. Filed Aug. 15, 1968, Ser. No. 752,779
Int. Cl. C07f 7/08
U.S. Cl. 260—448.2       5 Claims

ABSTRACT OF THE DISCLOSURE

Alkylmethylphenylsilanols and monoalkylmethylphenylsilanes in which the alkyl group has from 12 to 45 carbon atoms are disclosed. The alkylmethylphenylsilanes are useful as evaporation accelerators.

---

This invention relates to alkylmethylphenylsilanes.

An object of the present invention is to provide a new class of alkylmethylphenylsilanes which are useful as evaporation accelerators.

This invention relates to an alkylmethylphenylsilane of the formula $$(C_nH_{2n+1})\underset{\underset{CH_3}{|}}{\overset{\overset{C_6H_5}{|}}{Si}}X$$

wherein X is selected from the group consisting of a hydroxyl radical and a hydrogen atom and $n$ is an integer of from 12 to 45 inclusive.

The alkylmethylphenylsilanes of the present invention can best be prepared by reacting an α-olefin with $H(C_6H_5)(CH_3)SiCl$ in the presence of a platinum catalyst, such as chloroplatinic acid. One mole of silane to one mole of α-olefin is the preferred reaction ratio. The resulting product has a formula

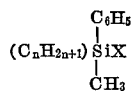

$$(C_nH_{2n+1})\underset{\underset{CH_3}{|}}{\overset{\overset{C_6H_5}{|}}{Si}}Cl$$

This chlorosilane is mixed with sodium bicarbonate to produce a silanol of the formula

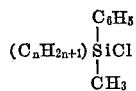

$$(C_nH_{2n+1})\underset{\underset{CH_3}{|}}{\overset{\overset{C_6H_5}{|}}{Si}}OH$$

and the chlorosilane is reacted with lithium aluminum hydride to produce a silane of the formula

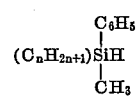

$$(C_nH_{2n+1})\underset{\underset{CH_3}{|}}{\overset{\overset{C_6H_5}{|}}{Si}}H$$

The α-olefin can be any alkene which has a carbon-carbon double bond at a terminal carbon atom and has 12 to 45 carbon atoms. The α-olefins can be either straight chained or branched and included, for example α-dodecene, α-pentadecene, α-octadecene, α-nonadecene, $CH_2{=}CH(CH_2)_{20}CH_3$ $CH_2{=}CH(CH_2)_6CH(CH_3)(CH_2)_8CH_3$ $CH_2{=}CH(CH_2)_{26}CH_3$ $CH_2{=}CH(CH_2)_{42}CH_3$ $CH_2{=}C[CH_2CH(CH_3)_2](CH_2)_{10}CH_3$ $CH_2{=}CH(CH_2)_{21}CH_3$ $CH_2{=}CH(CH_2)_{12}CH(CH_3)(CH_2)_4C(CH_3)_2(CH_2)_7CH_3$ $CH_2{=}CH(CH_2)_{17}CH_3$ and $CH_2{=}CH(CH_2)_{19}CH_3$ The alkylmethylphenylsilanes of the present invention can include, for example,

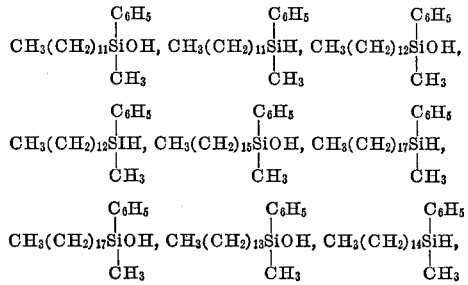

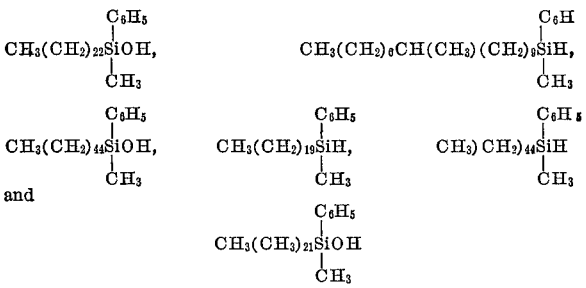

The alkylmethylphenylsilanes of the present invention are particularly useful as evaporation accelerators. The alkylmethylphenylsilanes are applied to the surface of an aqueous body which is exposed to a gaseous atmosphere. The amount of alkylmethylphenylsilane applied is determined by the desired results and the temperature and movement of the gaseous atmosphere or aqueous body as well as the particular nature of both the gaseous atmosphere and the aqueous body. The amount of alkylmethylphenylsilane can be used to increase the evaporation rate to cause increased cooling or it can be used to dry an aqueous body quicker.

The most preferred alkylmethylphenylsilanes are those in which X is a hydrogen atom.

The following examples are illustrative only and should not be construed as limiting the invention which is properly delineated in the appended claims.

EXAMPLE 1

(A) In a small bottle, 11.0 g. of $H(C_6H_5)(CH_3)SiCl$ was placed and then 19.6 g. of octadecene-1 and 5 drops of a solution of one weight percent platinum as chloroplatinic acid in isopropanol was added to the silane. This bottle was closed and placed in a 100° C. oven. After two hours the reaction mixture showed no evidence of silicon-bonded hydrogen and the mixture was allowed to cool overnight. The octadecylmethylphenylchlorosilane, $(C_{18}H_{37})(C_6H_5)(CH_3)SiCl$ was recovered from the reaction mixture by distillation under reduced pressure. The refractive index $n_D^{25}$, was 1.4864 for $(C_{18})(C_6H_5)(CH_3)SiCl$.

(B) Two grams of $(C_{18}H_{37})(C_6H_5)(CH_3)SiCl$ was placed in a small vial and dioxane added as a solvent. To the resulting solution, LiAlH$_4$ in dioxane was slowly added causing an evolution of gas and the mixture became warm. The vial was loosely capped and allowed to stand overnight. The resulting mixture was filtered to remove any excess LiAlH$_4$ and LiCl–AlCl$_3$. The dioxane was stripped from the solution and the residue was mixed with water and toluene. The toluene portion was removed and dried overnight over calcium sulfate. The calcium sulfate was removed from the toluene solution by filtering and the toluene was removed by distillation. The residue was octadecylmethylphenylsilane, $(C_{18}H_{37})(C_6H_5)(CH_3)SiH$, having a refractive index, $n_D^{25}$ of 1.4826.

(C) Sodium bicarbonate was mixed with some of the $(C_{18}H_{37})(C_6H_5)(CH_3)SiCl$. The resulting mixture was allowed to stand with occasional stirring. Carbon dioxide evolved from the mixture which became warm. The mixture was dissolved in diethyl ether and the sodium chloride formed in the reaction was filtered off. The diethyl ether was evaporated and the resulting product was $(C_{18}H_{37})(C_6H_5)(CH_3)SiOH$ and had a refractive index $n_D^{25}$ of 1.4859.

(D) Ten weight percent solutions of octadecylmethylphenylsilanol in diethyl ether and octadecylmethylphenylsilane in diethyl ether were prepared. Ten drops of each of these two ether solutions were placed on the surface of 100 g. of tap water in a 250 ml. stainless steel cup. The resulting assembly was placed in a controlled atmosphere of 65% relative humidity and 68° F. The weight of the cup, water and ether solution was initially made and then observed at time intervals of 1 day, 2 days, 5 days and 7 days. A control cup was also placed in the controlled atmosphere. The control was prepared as above, but without any silane solution. A solution was prepared as described above except octadecylmethylphenylacetoxysilane was used in place of either $(C_{18}H_{37})(C_6H_5)(CH_3)SiOH$ or $(C_{18}H_{37})(C_6H_5)(CH_3)SiH$. This particular solution was used as a comparison of the alkylmethylphenylsilanes of the present invention.

The results below are the weight percentages of water lost in a given period of time under the test conditions.

| | Percent water loss after | | | | Percent increase over control |
|---|---|---|---|---|---|
| | 1 day | 2 days | 5 days | 7 days | |
| Control | 7.3 | 14.7 | 35.0 | 47.2 | |
| $C_{18}H_{37}\underset{\underset{CH_3}{\|}}{\overset{\overset{C_6H_5}{\|}}{Si}}OH$ | 8.3 | 16.3 | 39.8 | 54.3 | 15.0 |
| $C_{18}H_{37}\underset{\underset{CH_3}{\|}}{\overset{\overset{C_6H_5}{\|}}{Si}}H$ | 13.3 | 28.6 | 59.3 | 79.0 | 67.4 |
| $C_{18}H_{37}\underset{\underset{CH_3}{\|}}{\overset{\overset{C_6H_5}{\|}}{Si}}O-\overset{O}{\overset{\|}{C}}CH_3$ | | 4.9 | 18.8 | 29.4 | −37.7 |

EXAMPLE 2

When the following olefins are reacted with $H(C_6H_5)(CH_3)SiCl$ and the processes described in Example 1 are carried out, the products as shown in the following table are obtained.

| Olefin | Product obtained by method of Example 1(B) | Product obtained by method of Example 1(C) |
|---|---|---|
| $CH_2=CH(CH_2)_{29}CH_3$ | $CH_3(CH_2)_{31}\underset{\underset{CH_3}{\|}}{\overset{\overset{C_6H_5}{\|}}{Si}}H$ | $CH_3(CH_2)_{31}\underset{\underset{CH_3}{\|}}{\overset{\overset{C_6H_5}{\|}}{Si}}OH$ |
| $CH_2=CH(CH_2)_{25}CH_3$ | $CH_3(CH_2)_{27}\underset{\underset{CH_3}{\|}}{\overset{\overset{C_6H_5}{\|}}{Si}}H$ | $CH_3(CH_2)_{27}\underset{\underset{CH_3}{\|}}{\overset{\overset{C_6H_5}{\|}}{Si}}OH$ |
| $CH_2=CH(CH_2)_{42}CH_3$ | $CH_3(CH_2)_{44}\underset{\underset{CH_3}{\|}}{\overset{\overset{C_6H_5}{\|}}{Si}}H$ | $CH_3(CH_2)_{44}\underset{\underset{CH_3}{\|}}{\overset{\overset{C_6H_5}{\|}}{Si}}OH$ |
| $CH_2=CH(CH_2)_9CH_3$ | $CH_3(CH_2)_{11}\underset{\underset{CH_3}{\|}}{\overset{\overset{C_6H_5}{\|}}{Si}}H$ | $CH_3(CH_2)_{11}\underset{\underset{CH_3}{\|}}{\overset{\overset{C_6H_5}{\|}}{Si}}OH$ |
| $CH_2=CH(CH_2)_6\overset{\overset{CH_3}{\|}}{CH}(CH_2)_9CH_3$ | $CH_3(CH_2)_9\overset{\overset{CH_3}{\|}}{CH}(CH_2)_8\underset{\underset{CH_3}{\|}}{\overset{\overset{C_6H_5}{\|}}{Si}}H$ | $CH_3(CH_2)_9\overset{\overset{CH_3}{\|}}{CH}(CH_2)_8\underset{\underset{CH_3}{\|}}{\overset{\overset{C_6H_5}{\|}}{Si}}OH$ |
| $CH_2=CH(CH_2)_{13}CH_3$ | $CH_3(CH_2)_{15}\underset{\underset{CH_3}{\|}}{\overset{\overset{C_6H_5}{\|}}{Si}}H$ | $CH_3(CH_2)_{15}\underset{\underset{CH_3}{\|}}{\overset{\overset{C_6H_5}{\|}}{Si}}OH$ |
| $CH_2=CH(CH_2)_{17}CH_3$ | $CH_3(CH_2)_{19}\underset{\underset{CH_3}{\|}}{\overset{\overset{C_6H_5}{\|}}{Si}}H$ | $CH_3(CH_2)_{19}\underset{\underset{CH_3}{\|}}{\overset{\overset{C_6H_5}{\|}}{Si}}OH$ |

That which is claimed is:
1. An alkylmethylphenylsilane of the formula $$(C_nH_{2n+1})\underset{\underset{CH_3}{|}}{\overset{\overset{C_6H_5}{|}}{Si}}X$$

wherein X is selected from the group consisting of a hydroxyl radical and a hydrogen atom and $n$ is an integer of from 12 to 45 inclusive.

2. The alkylmethylphenylsilane in accordance with claim 1 in which X is a hydroxyl radical.

3. The alkylmethylphenylsilane in accordance with claim 1 in which X is a hydrogen atom.

4. The alkylmethylphenylsilane in accordance with claim 2 in which $n$ is 18.

5. The alkylmethylphenylsilane in accordance with claim 3 in which $n$ is 18.

References Cited

UNITED STATES PATENTS 2,456,783   12/1948   Hyde.

TOBIAS E. LEVOW, Primary Examiner
P. F. SHAVER, Assistant Examiner